(12) United States Patent
Shost (10) Patent No.: US 6,766,819 B2
(45) Date of Patent: Jul. 27, 2004

(54) APPARATUS AND METHOD FOR ADJUSTING AND SEALING A SOLENOID VALVE

(75) Inventor: Mark Anthony Shost, El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 360 days.

(21) Appl. No.: 09/934,145

(22) Filed: Aug. 21, 2001

(65) Prior Publication Data

US 2003/0038262 A1 Feb. 27, 2003

(51) Int. Cl.$^7$ .............................................. F16K 31/02
(52) U.S. Cl. ........................... 137/15.18; 137/315.03; 251/129.18
(58) Field of Search ................. 251/129.18, 129.15; 137/15.18, 315.03; 29/602.1; 123/518, 519, 520, 521

(56) References Cited

U.S. PATENT DOCUMENTS

| | | | |
|---|---|---|---|
| 5,967,487 A | 10/1999 | Cook et al. ................ 251/64 |
| 6,347,616 B1 | 2/2002 | Rodriguez et al. .......... 123/520 |
| 6,463,951 B2 | 10/2002 | Shost ...................... 137/15.18 |
| 6,467,459 B2 | 10/2002 | Machida et al. ............ 123/492 |
| 6,467,495 B2 | 10/2002 | Shost ...................... 137/15.18 |
| 6,595,485 B2 | 7/2003 | Burrola et al. ............... 251/64 |

FOREIGN PATENT DOCUMENTS

| | | | | |
|---|---|---|---|---|
| DE | 10157863 A1 | 6/2002 | ........... F16K/31/06 |
| DE | 10158061 A1 | 8/2002 | ........... F16K/31/06 |

*Primary Examiner*—John Bastianelli
(74) *Attorney, Agent, or Firm*—Jimmy L. Funke (57) ABSTRACT

An evaporative control valve for a vehicle. The valve has a valve body for containing a solenoid that manipulates a plunger between an open position and a closed position the plunger has a valve end. The valve body also has a receiving area, a first port, as well as a conduit for connecting the first port to the receiving area. A port member is received and engaged within the receiving area and the port member provides a passageway from the receiving area to outside the valve body and the valve end seals the passageway when the plunger is in its closed position. The port member is inserted into the receiving area by a guide pin and the guide pin sets the stroke of the plunger as it is inserted into the receiving area.

23 Claims, 11 Drawing Sheets

APPARATUS AND METHOD FOR ADJUSTING AND SEALING A SOLENOID VALVE

CROSS REFERENCE TO RELATED APPLICATIONS

This application is related to commonly owned and assigned U.S. patent application Ser. Nos. 09/725,396 and 09/725,423 both filed on Nov. 29, 2000, the contents of which are incorporated herein by reference thereto.

TECHNICAL FIELD

The present invention relates to control valves and more particularly, to an apparatus and method for providing a solenoid actuated valve.

BACKGROUND

Evaporative solenoid control valves (EVAP) control purge flow from a purge canister and the intake manifold of an automotive engine.

One such EVAP valve employs the use of a port member and an ultrasonic attachment process to seal the port member to the solenoid valve and prevent external leaks. However, the use of an ultrasonic weld is problematic in that the welding process creates debris inside the solenoid which may be attributable to the failure of the valve. In addition, the ultrasonic welding process deforms the surface of the solenoid valve which will adversely affect the appearance of the final product.

Other problems encountered with the ultrasonic welding process of the port member to the solenoid valve may include improper positioning of the port of the port member with respect to the solenoid plunger. This may be the source of an undesirable noise associated with the operation of the solenoid valve.

In addition, the sealing of the port member to the solenoid valve assembly provides potential areas for leakage to occur. Moreover, the primary function of an EVAP valve depends on the transfer of gaseous materials from one point to another through the use of an EVAP valve. Accordingly, any leakage will affect the performance of the valve.

Therefore, an EVAP valve's design should prevent potential leakage areas as well as increase the performance and/or cost of the same. Accordingly, an EVAP valve's design should provide ease of assembly and disassembly, exhibit good magnetic flux transfer characteristics, provide an airtight passage from one point to another without impeding air flow, and be cost-efficient.

SUMMARY OF THE INVENTION

An evaporative control valve for a vehicle having a valve body and a solenoid for manipulating a plunger mechanism between an open position and a closed position, the plunger has a valve end for opening and closing a first port into a receiving area. A port member having the first port is secured to the evaporative control valve and the receiving area. The port member sets the stroke of the plunger as it is inserted into the receiving area.

A method for constructing a solenoid valve assembly, with a preset stroke of a plunger of the valve assembly, a stop is inserted into a cavity of the solenoid and the stop is inserted through the valve chamber of the solenoid valve assembly. After the stop is inserted, a spring is inserted into the cavity. A plunger is then inserted into the cavity after the spring has been inserted, the plunger has a valve member for sealing a port of a port member. A port member is then inserted into the valve chamber, a portion of the port member makes contact with the plunger and positions the plunger in a spring biased position and the port member it is secured to the solenoid valve assembly.

The above-described and other features and advantages of the present invention will be appreciated and understood by those skilled in the art from the following detailed description, drawings, and appended claims.

DETAILED DESCRIPTION OF THE PREFERRED EMBODIMENT

Figure 1:
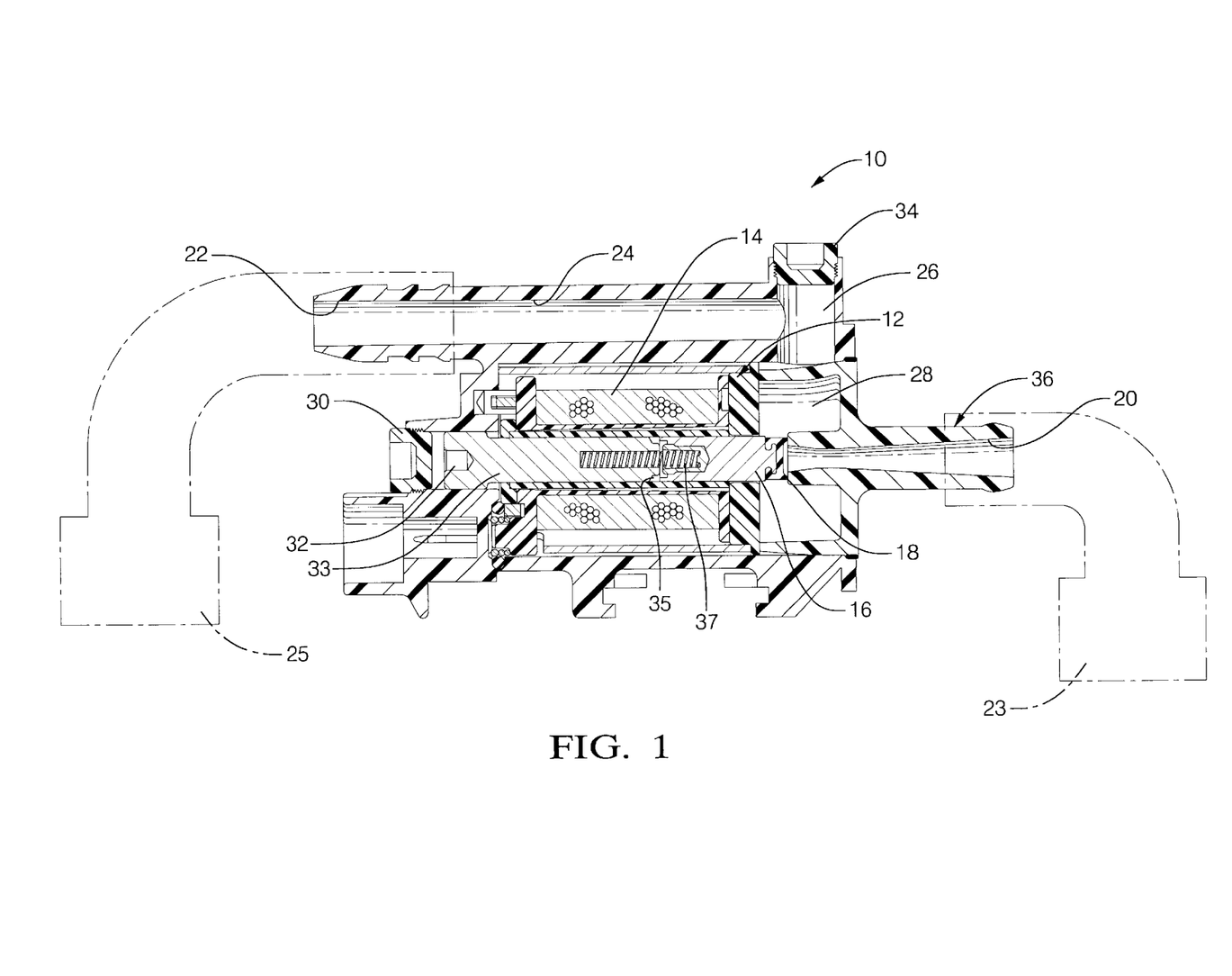
FIG. 1 is a cross-sectional view of a solenoid actuated valve assembly.

Referring now to FIG. 1, a solenoid valve assembly 10 is illustrated. One contemplated use for valve assembly 10 is the insertion of valve assembly 10 intermediate to a canister and an intake manifold of a vehicle. Of course, and as applications may require, valve assembly 10 can be used in numerous applications.

Valve assembly 10 includes a solenoid assembly, coil or magnetic package 12 which in response to a magnetic flux generated by a coil 14, causes a plunger 16 to open and close a valve passageway 18. Valve passageway 18 provides a means for connecting a rear port 20 to a front port 22. Front port 22 is coupled to a charcoal canister 25, and rear port 20 is coupled to an intake manifold 23 for use in an evaporative emission control system of a vehicle.

Figure 2:
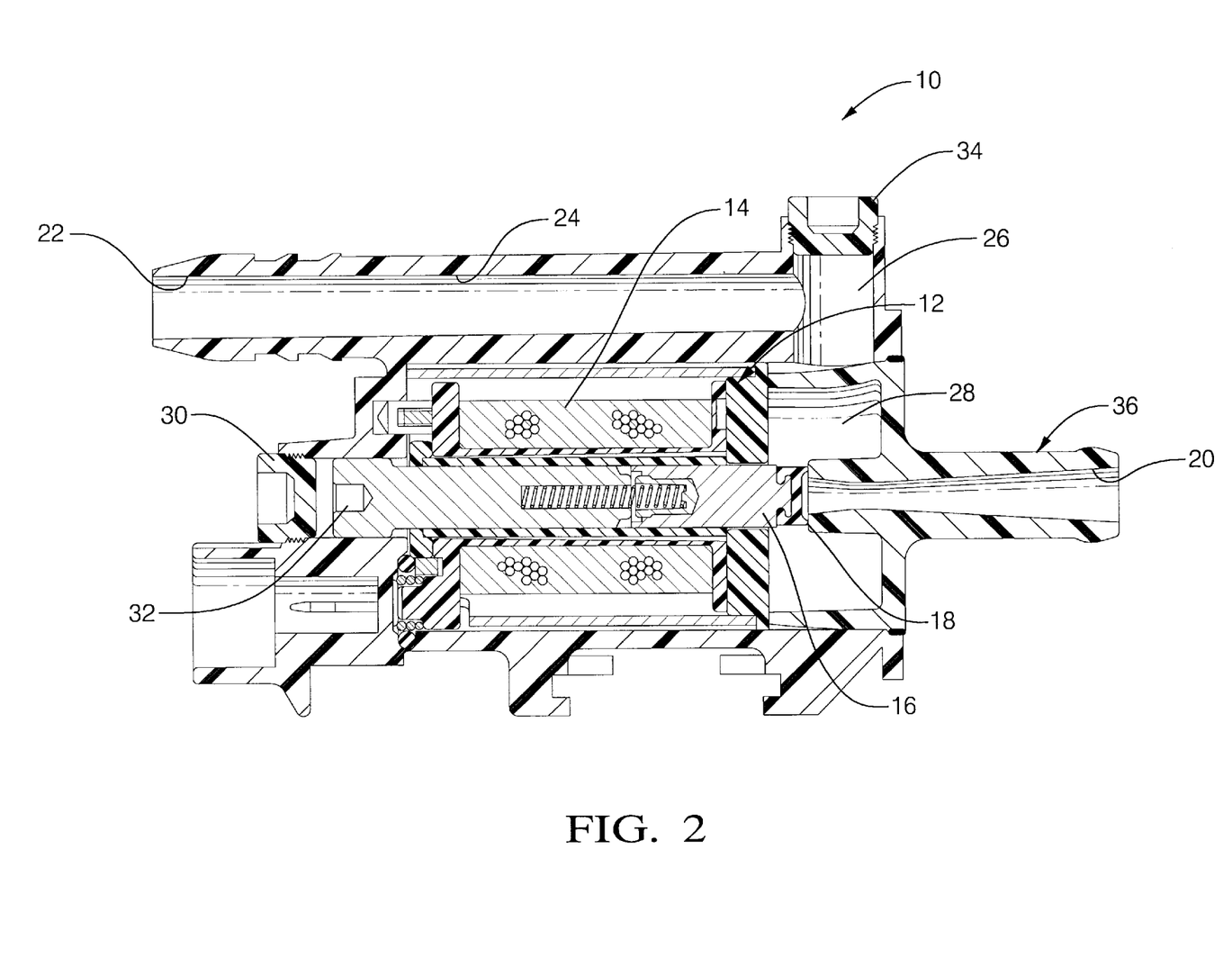
FIG. 2 illustrates an operational position of the solenoid actuated valve assembly depicted in FIG. 1.

In addition, a side channel 24 connects rear port 20 to a cross slide channel 26. Cross slide 26 connects side channel 24 to a coil chamber 28. Accordingly, and as solenoid 12 manipulates valve 18 from a closed position (FIG. 1) to an open position (FIG. 2), front port 22 is connected to rear port 20.

Valve assembly 10 is positioned for use in an evaporative (EVAP) emission control system of an automobile. The EVAP valve assembly of FIG. 1 also includes a rear plug 30 which is inserted after the stroke of solenoid 12 is adjusted through the manipulation of an adjustment screw portion 32 of a stop 33 to vary the size of an air gap 35 between plunger 16 and stop 33. The size of air gap 35 relates to the stroke of solenoid 12. In addition, a spring 37 is positioned within corresponding cavities within plunger 16 and stop 33. Spring 37 provides an urging force to plunger 16 to return it to its unmanipulated (from solenoid 12) position. Once the stroke of solenoid 12 has been set by the adjustment of screw 32, rear plug 30 is permanently sealed to valve assembly 10.

Cross slide 26 is initially manufactured to have three openings—a first opening into side channel 24, a second opening into valve chamber 28, and a third opening to the exterior of valve assembly 10.

A side plug 34 is permanently secured into the third opening of cross slide 26 in order to complete the passageway from front port 22 to rear port 20.

A port member 36 is secured to the sidewalls of coil chamber 28 through the use of an ultrasonic weld. However, the ultrasonic welding process may create debris that can accumulate within coil chamber 28 and may be attributable to the failure of the valve assembly. In addition, the ultrasonic welding process deforms the surface of the solenoid valve which will adversely affect the appearance of the final product.

Other problems encountered with the ultrasonic welding process of the port member to the solenoid valve may include improper positioning of the portion of port which makes contact with a portion of plunger 16. This misalignment may cause improper sealing of the valve passageway 18 and may also be the source of an undesirable noise associated with the operation of the solenoid valve (i.e. movement of plunger from the position illustrated in FIG. 1 to the position illustrated in FIG. 2 and back to the position in FIG. 1).

In addition, the sealing of the port member to the solenoid valve assembly provides potential areas for leakage to occur. Moreover, the primary function of an EVAP valve depends on the transfer of gaseous materials from one point to another through the use of an EVAP valve. Accordingly, any leakage will affect the performance of the valve.

Referring now to FIGS. 3–7, a valve assembly 40 or an EVAP valve assembly 40 constructed in accordance with an exemplary embodiment of the present invention is illustrated. EVAP valve assembly 40 has a main body portion 42 and a port 44. In an exemplary embodiment, valve assembly 40 and port 44 are constructed out of a lightweight, durable, nonconductive material, such as plastic, that is easily manufactured and molded.

Figure 3A:
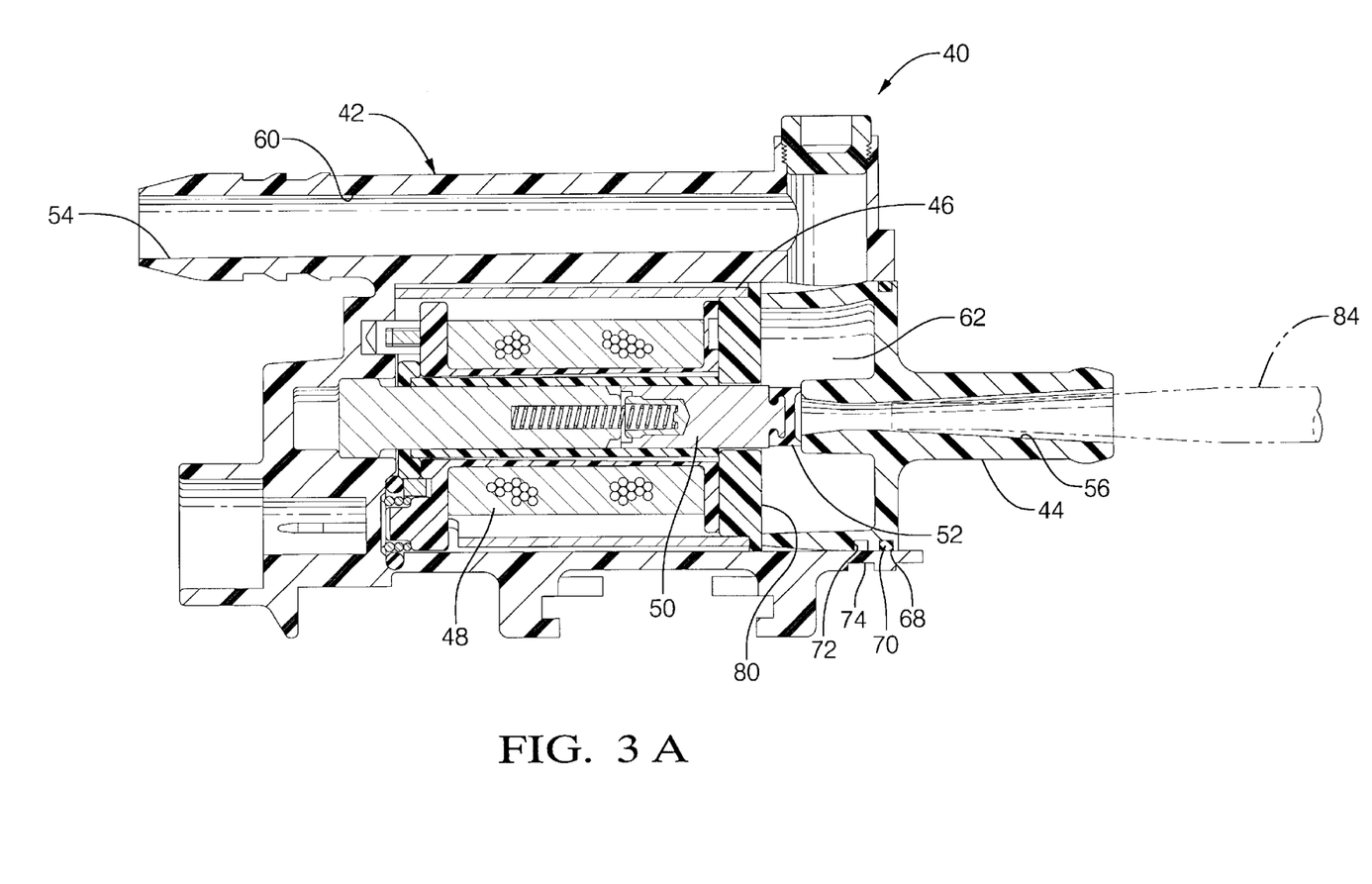
FIG. 3A is an exploded cross-sectional view of a solenoid actuated valve assembly constructed in accordance with an exemplary embodiment of the present invention.
Figure 3B:
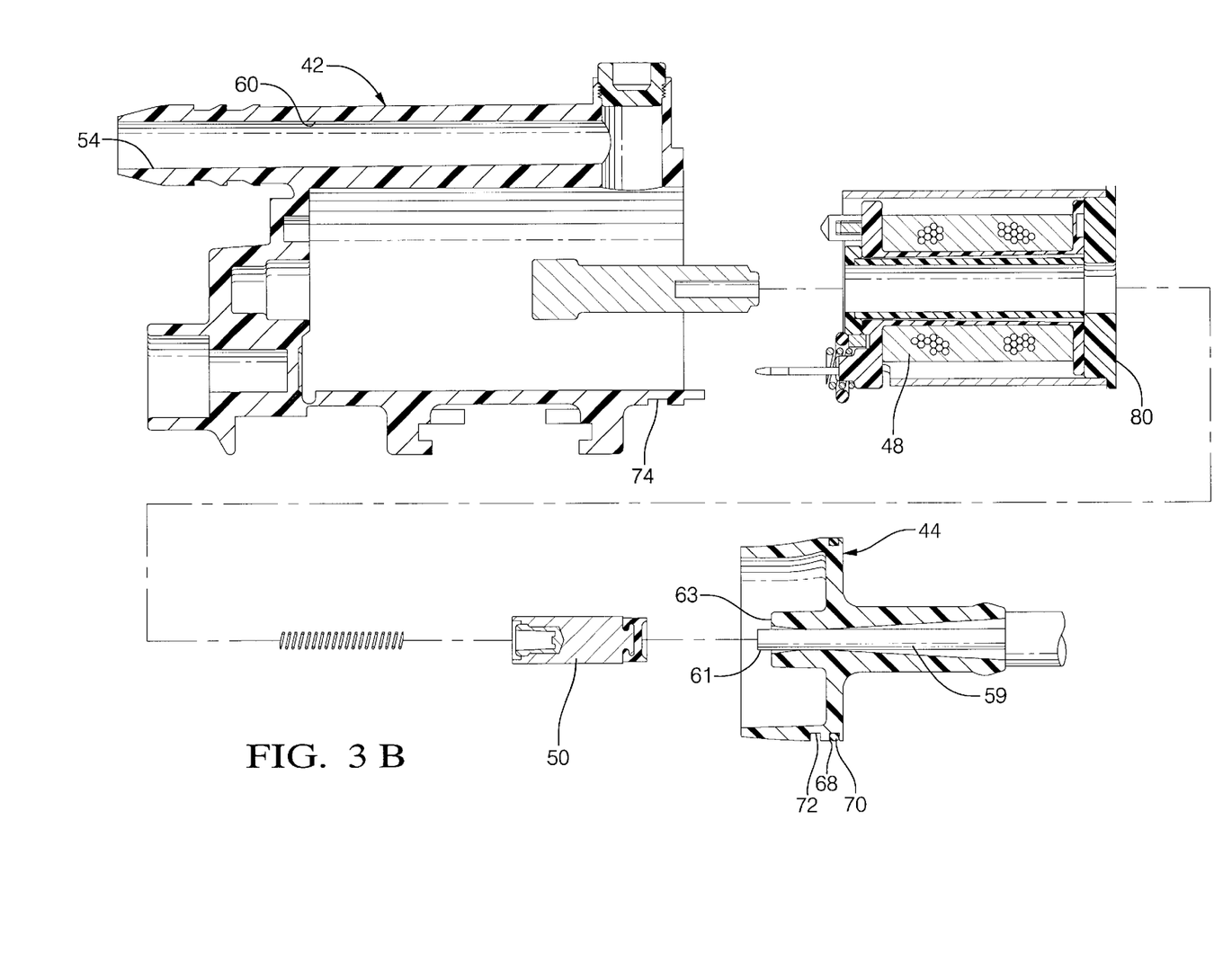
FIGS. 3B–E are cross-sectional views of portions of the assembly process of a solenoid actuated valve assembly constructed in accordance with an exemplary embodiment of the present invention.
Figure 3C:
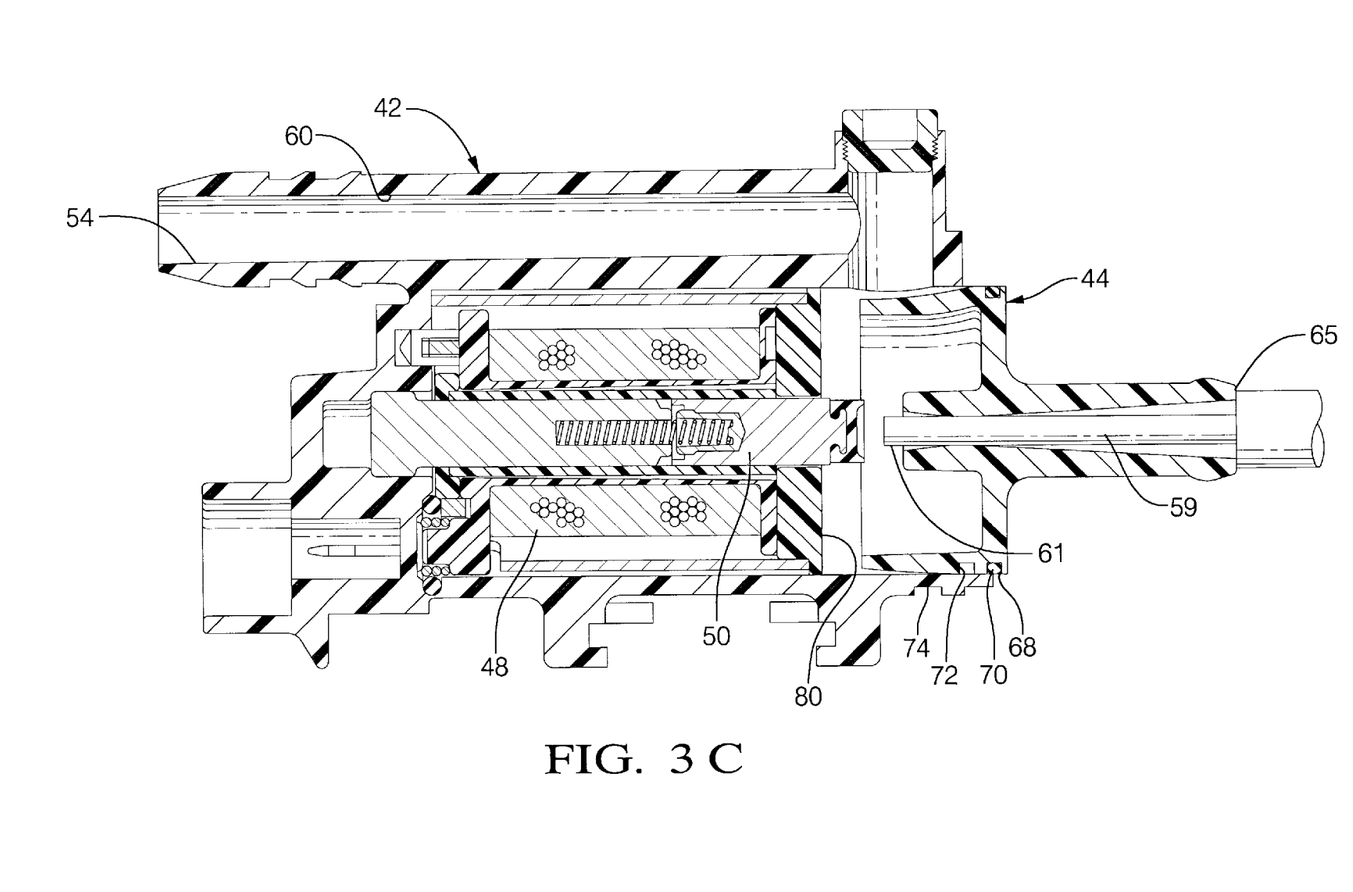
Figure 3D:
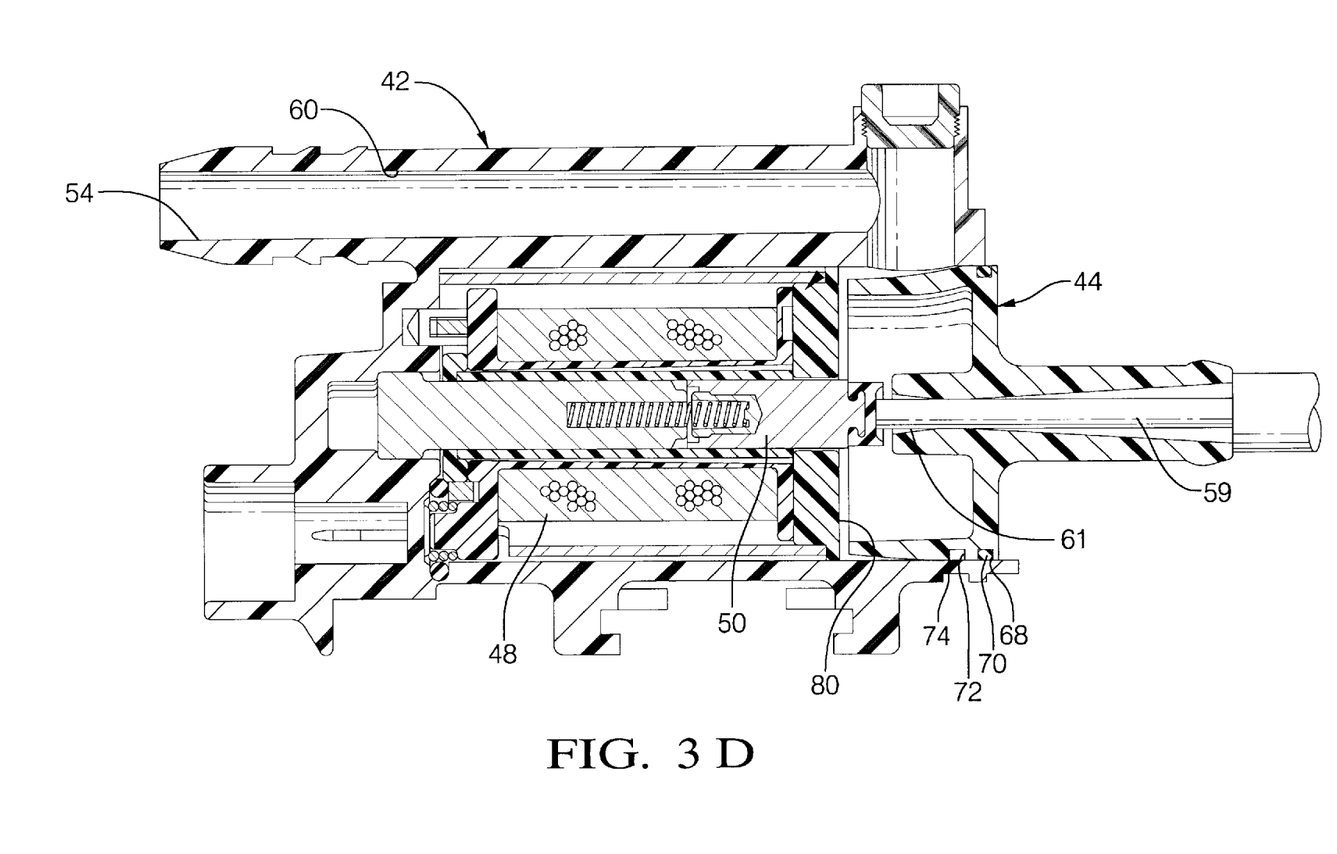
Figure 3E:
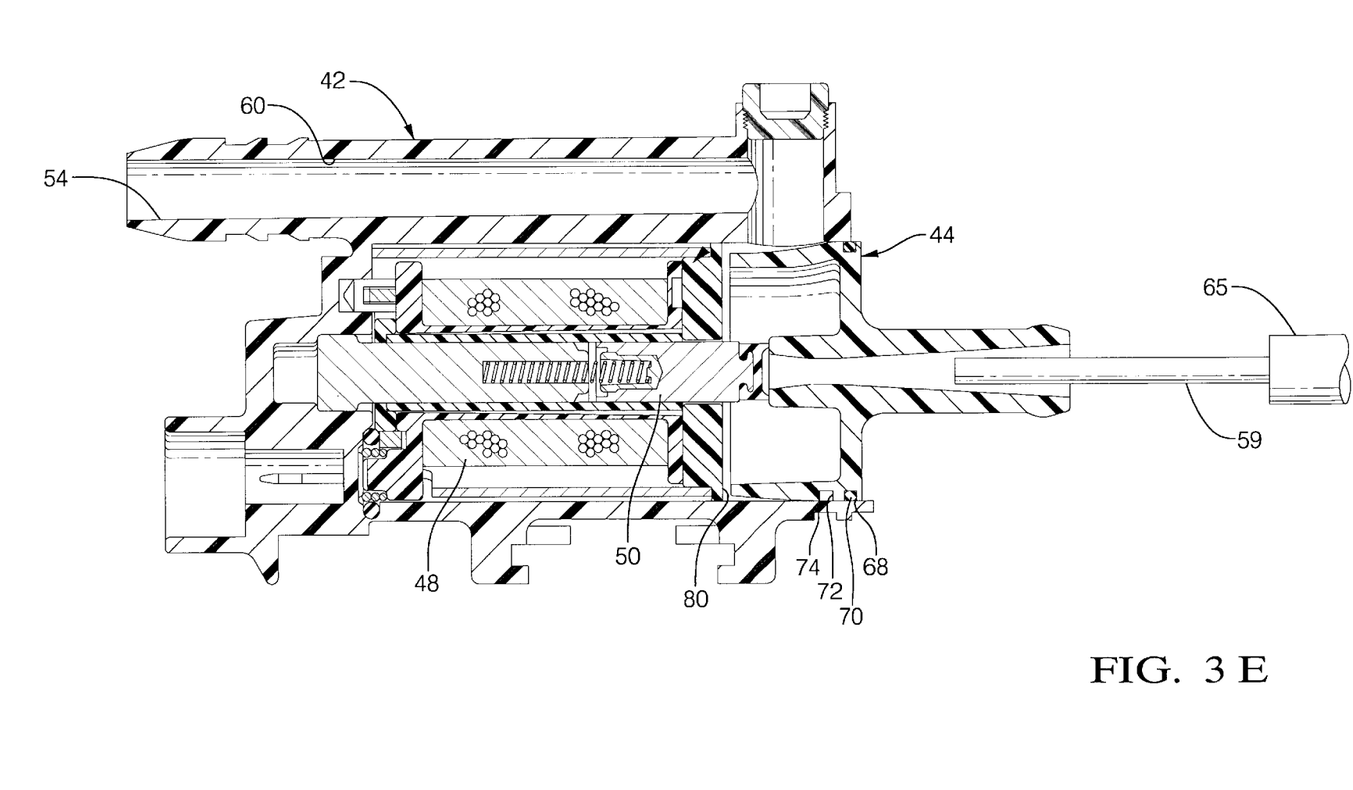

Valve assembly 40 also includes a solenoid assembly, coil or magnetic package 46. Solenoid assembly 46 is centrally located within valve assembly 40, and in response to a magnetic flux generated by a coil 48, a plunger 50 is manipulated from a closed position to an open position that causes a valve member 52 to open and close a valve passageway. In an exemplary embodiment, valve member 52 is constructed out of a flexible material, such as rubber, capable of sealing the valve passageway. Accordingly, solenoid 46, through the manipulation of valve member 52, provides a means for connecting a rear port 54 to a front port 56. As an alternative, solenoid assembly 46 is replaced by another mechanism capable of manipulating plunger 50 from an open position to a closed position.

Front port 56 is coupled to an intake manifold (not shown) at one end and makes intermittent contact with valve member 52 as it moves from an open position to a closed position. Rear port 54 is coupled to a charcoal canister (not shown) for use in an evaporative emission control system of a vehicle.

Accordingly, and as solenoid assembly 46 manipulates valve 52 from a closed position to an open position, front port 56 is connected to rear port 54.

In contrast to the valve illustrated in FIG. 1, there is no requirement for a screw adjustment of the stop and accordingly there is no need for a plug to be inserted and welded to the valve assembly after the stroke of the solenoid has been determined.

In fact, the stop is inserted or press fitted into the central opening of the solenoid assembly. The solenoid assembly and stop is inserted through the valve chamber prior to the securement of the port member to the main body portion (FIGS. 3B–3E). Thus, there is no need for a plug as in FIG. 1. Prior to the insertion of the solenoid assembly into the housing the stop is inserted until it is located in a fixed position within the center cavity of the solenoid assembly. The solenoid assembly and stop is then inserted into the housing.

In one embodiment the stop has a "T" shape or configuration (FIGS. 3A–3E) in which the stop has a stop member that makes contact with a portion of the solenoid assembly and a portion of the housing after the solenoid assembly is inserted therein. Thus, once the solenoid assembly is inserted into the housing the stop is fixedly secured with respect to the solenoid assembly. Of course, other configurations of the stop member are contemplated in accordance with the present invention. Alternatively, the stop is press fitted into the central opening.

Referring now to FIGS. 3B–3E, a spring or other biasing member is then inserted and plunger 50 is inserted after the spring. The spring is positioned between the plunger and the stop. Accordingly, plunger 50 will be spring biased in the direction of valve chamber 62.

Once plunger 50 is inserted within valve assembly 40, a guide pin or stroke guide 59 is inserted into port member 44 until a portion 61 protrudes outwardly of a valve seat 63 of port member 44. Portion 61 will define the stroke of the assembly. As port member 44 is inserted into valve chamber 62, portion 61 makes contact with valve member 52.

Accordingly, portion 61 will force plunger 50 against the biasing force of the spring until port member 44 is properly seated within valve chamber 62. In this position plunger 50 is positioned away from valve seat 63 approximately the same distance of portion 61. Accordingly, by knowing the size of portion 61 the desired stroke of the solenoid is reached by simply inserting port member 44 until it is properly seated within valve chamber 62.

In addition, knowing the size of portion 61 will also provide the assembler or manufacturer with a means for knowing or setting the flow of the valve assembly as the distance plunger is positioned away from valve seat 63 in an open position will be known.

Thus, plunger travel and thereby flow is set by sliding the port member into the desired axial position prior to the securement of the port member to the housing.

As illustrated in FIGS. 3B–3E, pin 59 is configured to have a stop portion 65 that makes contact with port member 44. Stop portion 65 is slightly larger than the opening of port member 44. Thus, and in order to position port member 44 within the housing, pin 59 is inserted until stop portion 65 makes contact with port member 44 and portion 61 protrudes out of valve seat 63. Accordingly, and as port member 44 is inserted within the housing portion 61 forces plunger 50 against the biasing force of the spring.

The positioning of stop portion 65 on pin 59 will determine the size of portion 61 and ultimately the stroke of the assembly. In addition, portion 65 allows ease of assembly as guide pin 59 is inserted in port member 44 and guide pin 59 is used to insert port member 44 into valve chamber 62.

Accordingly, and for purposes of explanation, if a desired stroke of 0.3 millimeters is desired pin 59 is configured so that portion 61 protrudes 0.3 millimeters from valve seat 63. Of course, other dimensions are considered for use in accordance with the present invention.

In accordance with this assembly process the location of the stop is known, the kinematic force of the spring is known and the amount of travel of the plunger caused by the insertion of port member 44 by pin 59 into valve chamber 62 is also known. Therefore, and in accordance with this assembly process, the stroke of the plunger will be known and there is no need for an adjustment of the same.

In accordance with an exemplary embodiment, the stroke of the solenoid assembly is set by the insertion of the port member into the valve chamber. Thus, there is no need for a rear plug.

A side channel 60 connects rear port 54 to a valve area or chamber 62. Valve chamber 62 is connected to port 56 as valve member 52 moves from a closed position to an open position.

Referring now to FIGS. 3–7, the securement of port member 44 to body portion 42 is illustrated. Port member 44 has an outer annular wall 64. The outside diameter of annular wall 64 is slightly smaller than the inside diameter of valve chamber 62.

A groove or receiving area 68 is positioned along the outer surface of annular wall 64. An O-ring 70 is inserted into groove 68 and as annular wall 64 of port member 44 is inserted into valve chamber 62, O-ring 70 is seated within groove 68 and provides a sealing means for port member 44 within valve chamber 62. The outside diameter of annular wall 64 and inside diameter of valve chamber 62 are sufficiently close enough so that the frictional engagement of O-ring 70 within groove 68 provides a means for sealing port member 44 within valve chamber 62.

As an alternative, groove 68 is located on the inside diameter of valve chamber 62. In yet another alternative a groove 68 is located on both the inside diameter of valve chamber 62 and annular wall 64.

Figure 4:
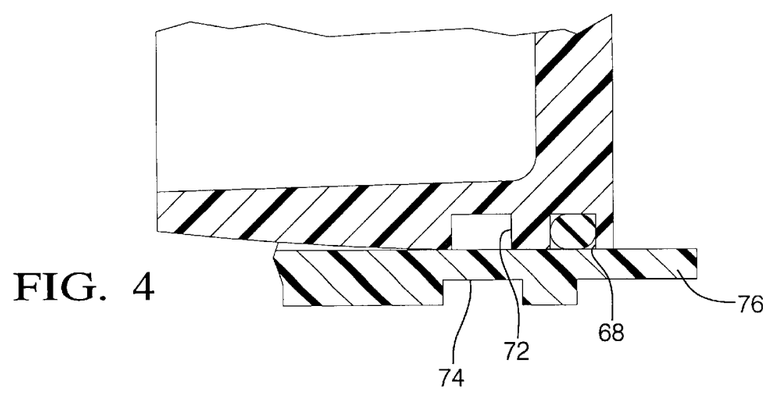
FIGS. 4 and 5 are cross-sectional views of portions of the solenoid actuated valve assembly illustrated in FIG. 3.
Figure 5:
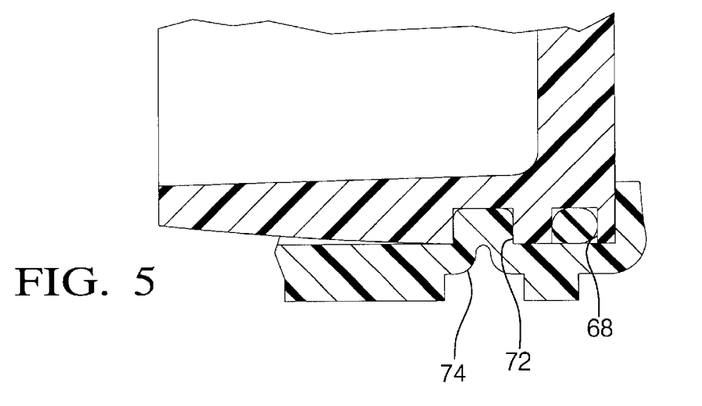
Figure 6:
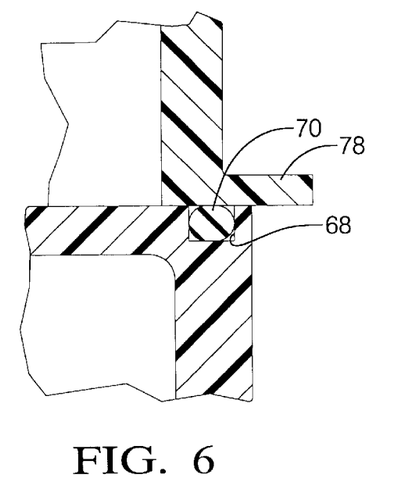
FIGS. 6 and 7 are cross-sectional views illustrating the heat staking process of the FIG. 3 embodiment.
Figure 7:
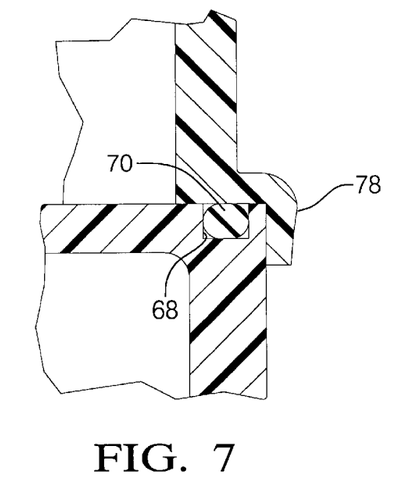

In addition, annular wall 64 has an engagement groove or receiving area 72 positioned along the outer surface of annular wall 64. In an exemplary embodiment, receiving area 72 is located proximate to the portion of port member 44 in which there is no fluid communication with a side channel 60. As port member 44 is inserted into its desired position, the outer wall of valve chamber 62 has a reduced thickness area 74 that corresponds to the location of groove 72 when port member 44 it is fully inserted into the desired location within valve chamber 62. Once in this location reduced thickness area 74 is heat staked into engagement groove 72 (FIGS. 4 and 5). The heat staking of the outer wall of valve chamber 62 causes a portion of the wall to assume the inwardly curved shape illustrated in FIG. 5.

The dimension of the outer wall of body portion 42 in close proximity to engagement groove 72 is significantly smaller than the dimension of body portion 42 surrounding solenoid assembly 46. The reduction in the outer wall thickness helps to effectuate the heat staking of body portion 42 to port member 44.

In addition, body portion 42 is also configured to have an extended tab portion 76 and an extended tab portion 78. Tab portion 76 is of a sufficient length to provide a securement means for securing port member 44 to body portion 42 once tab portion 76 is heat staked (FIG. 5). In addition, tab portion 78 also provides an additional securement means for securing port member to body portion 42 (FIGS. 6 and 7) at a location proximate to the fluid communication of port member 44 with side channel 60.

Accordingly, the heat staking of area 74 and tab portion 76 to port member 44 allows port member 44 to be fixedly secured to body portion 42 and within valve chamber 62.

O-ring 70 provides hermetic sealing of port member 44 to body portion 42 while the heat staking of portion 74 and tab portions 76 and 78 provide the structural sealing of port member 44. In addition to providing a sealing process in which there is no creation of debris or particulate matter which may adversely affect the performance of valve assembly 40, the use of an O-ring and a heat staking process allows greater flexibility and tolerance for adjusting the position port member 44 prior to its being sealed to body portion 42. This prevents improper alignment of port 56 and valve member 52.

In addition, and if port member is fully inserted into valve chamber 62 until a portion of annular wall 64 makes contact with a surface wall 80 of valve chamber 62, the final position of port member 44 will be known. This will greatly assist the assembly process has there will be no requirement for setting of the stroke of the solenoid assembly, as the final position of port member 44 will be known, and accordingly, the plunger of the solenoid assembly can be configured to indicate when valve member 52 is in a position in which it will effectively seal port 56. Therefore, this configuration will require no adjustments and the need for the adjustment screw is eliminated.

For example, plunger 50 may be pre-set at a position in which valve member 52 will make contact with port 56 when port member 44 is fully inserted into valve chamber 62. Alternatively, plunger 50 may be pre-set at a position in which valve member 52 will be a known distance away from port 56 when port member 44 is fully inserted into valve chamber 62.

Additionally, and when plunger 50 is preset at a position away from port 56 and since the final position of port 56 will be known no adjustment required for setting the stroke of the plunger. Accordingly, the assembly of the solenoid valve assembly will require fewer steps.

In addition, and as port member 44 is being inserted into valve chamber 62, and prior to the heat staking process, port member 44 is seated within valve chamber 62 so as to provide a proper alignment of port 56 with valve member 52. Port member 44 is configured to provide proper alignment of port 56 with valve member 52 when a portion of annular wall 64 and a second inner wall 82 make contact with wall portion 80 of solenoid assembly 46. Accordingly, and in order to properly seat port member 44 within valve chamber 62, port member 44 is inserted until annular walls 82 and 64 make contact with wall 80. Once port member 44 has been inserted into this position, the heat staking process takes place.

As an alternative to pin 59, a guide pin 84 is used to guide port member 44 into valve chamber 62. Guide pin 84 provides a means for aligning port member 44 with valve member 52 as well as providing a means for urging the plunger against the biasing force of the spring.

In one embodiment, guide pin 84 has an outer configuration for engaging port 56. Guide pin 84 may be manipulated manually by an individual assembling valve assembly 40 or in the alternative guide pin 84 is coupled to a mechanically actuated device which guides the insertion of port member 44 into valve chamber 62.

In addition, guide pin 84 or the mechanism actuating guide pin 84 can be configured with a means for measuring the length of travel of port member 44 from a starting point on guide pin 84 to an ending point where port member 44 is appropriately seated within valve chamber 62.

By configuring port member 44, namely annular walls 64 and 76 and the positioning of port 56 within annular walls 64 and 82, solenoid assembly 40 is assembled in a manner which will prevent the misalignment of valve member 52 with port 56 this negates the need for adjustments to the stroke of solenoid assembly 46.

Inner wall member 82 depends outwardly from a portion of annular wall 64 and has an arc-like configuration. Wall member 82 has a pair of openings 88, and the portion of wall member 82 containing openings 88 is positioned a distance away from annular wall 64 in order to allow for the passage of gas vapors etc. from port 56 into valve chamber 62 and ultimately into channel 60.

Figure 8:
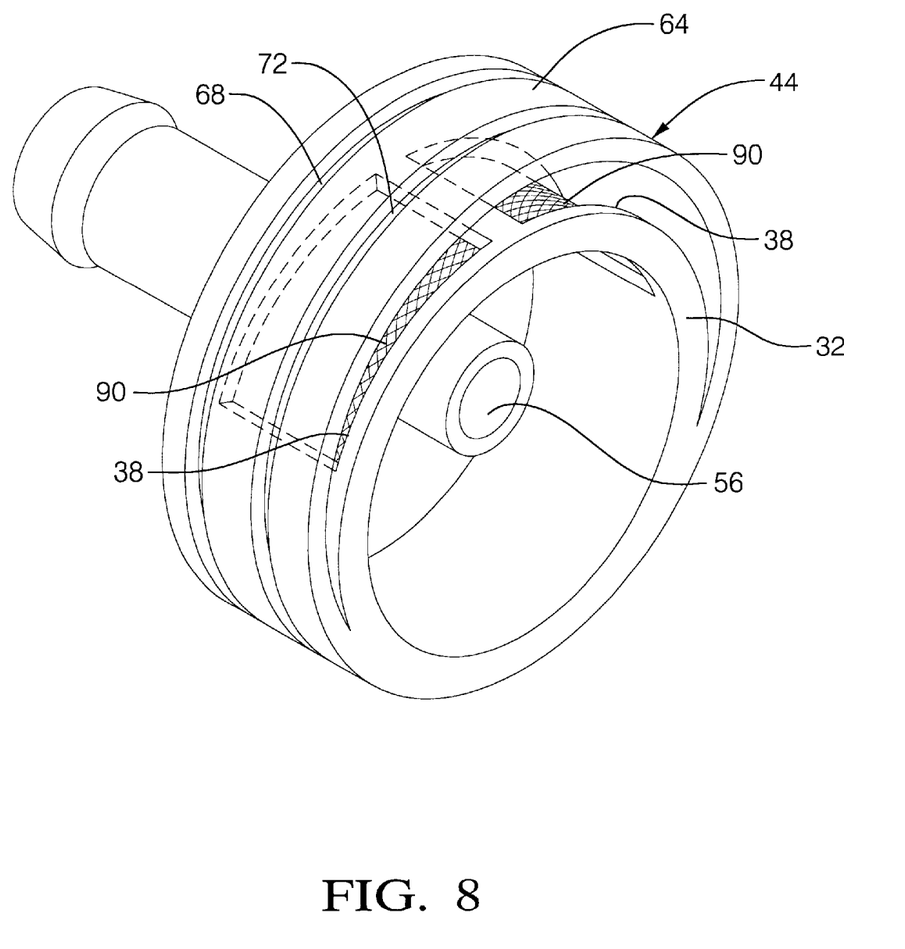
FIG. 8 is a perspective view of a port member of an exemplary embodiment of the present invention.
Figure 9:
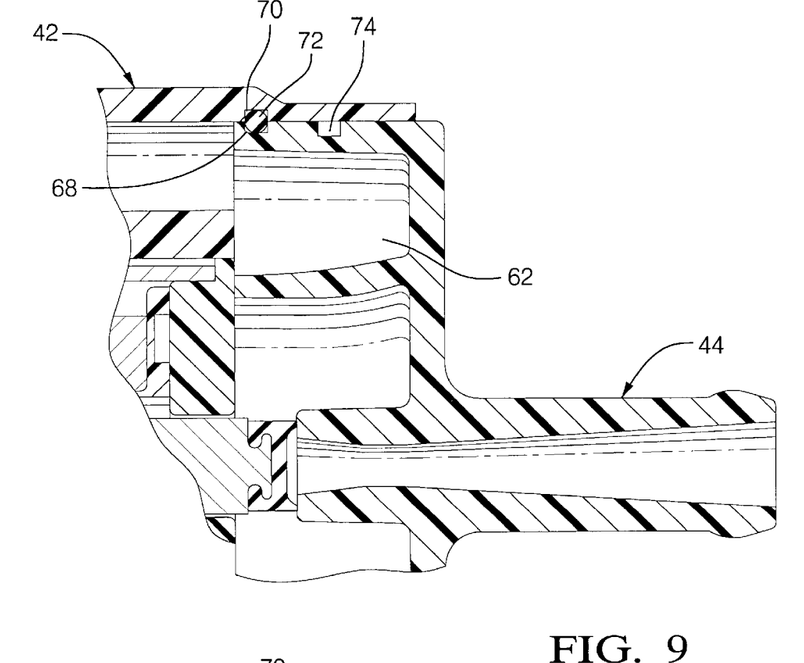
FIGS. 9 and 10 are detailed views of an alternative embodiment of the present invention.

As an alternative, and referring now to FIGS. 8 and 9, the outside diameter of annular wall 64 is configured to be slightly larger than the outside diameter of the wall defining valve chamber 62. In this configuration, port member 44 is configured to be placed over a portion of body portion 42.

Figure 10:
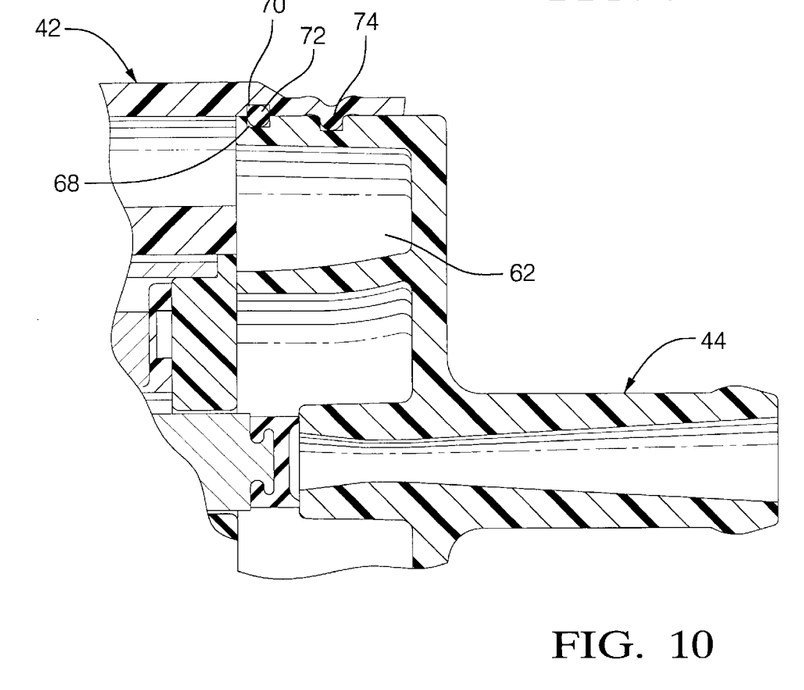
Figure 11:
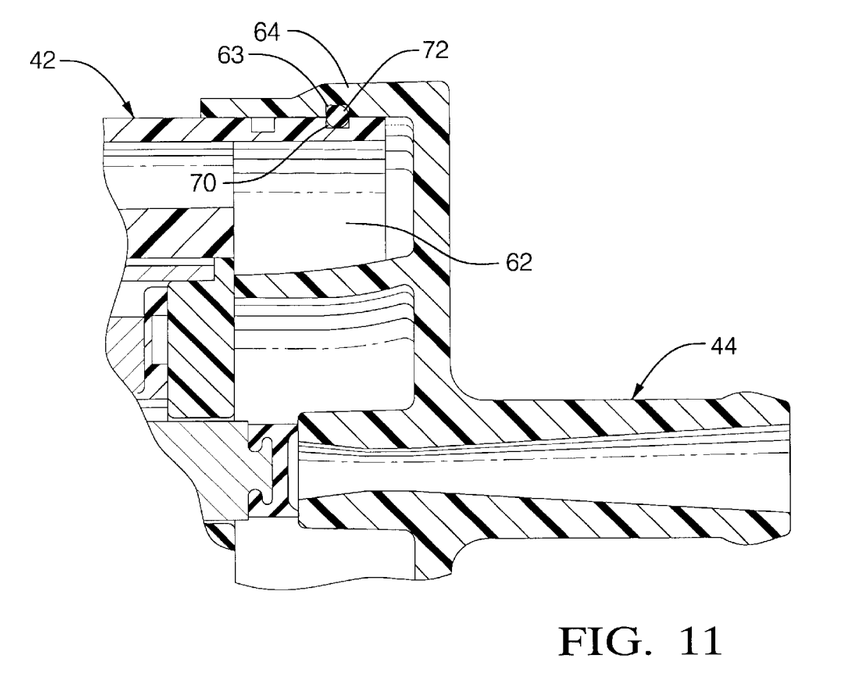
FIGS. 11 and 12 are detailed views of another alternative embodiment of the present invention.
Figure 12:
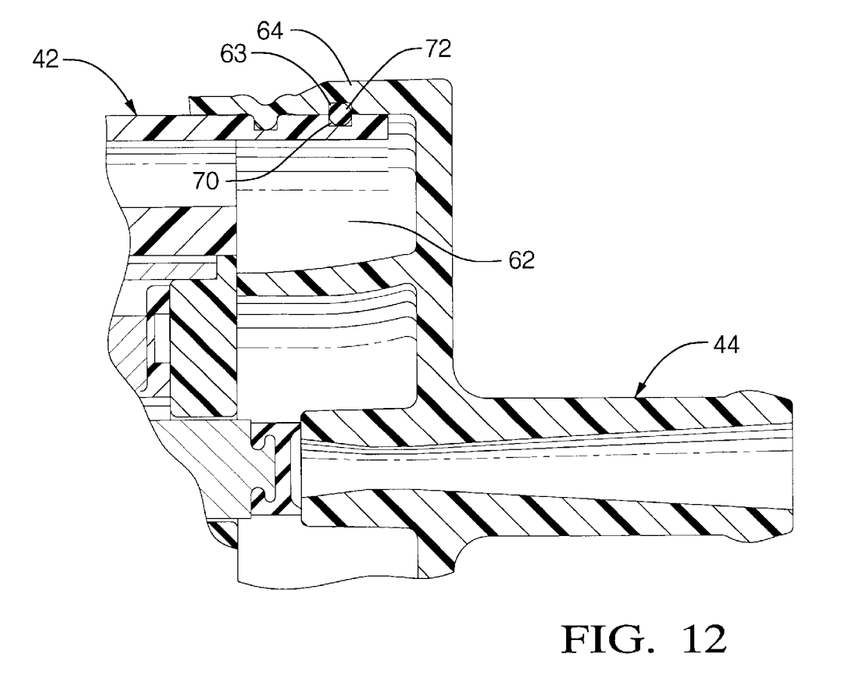

In this configuration, O-ring 70 is engaged within a groove 68 on either the inner surface of annular wall 64 or the outer surface of body portion 42. In this embodiment, inner wall 76 is configured to have an annular configuration with an outside diameter smaller than the inside diameter of valve chamber 64. In this embodiment, inner annular wall 76 properly aligns port 56 with valve member 52 when annular wall 76 makes contact with wall 80 of solenoid assembly 46. Once annular wall 76 makes contact with wall 80, annular wall 64 is heat staked (FIG. 10) into an engagement groove 74 positioned on the exterior surface of body portion 42.

In an exemplary embodiment, the outer diameter of valve chamber 62 is slightly larger than the diameter of annular wall 64.

As an alternative, openings 88 of annular wall 76 are fitted with a pair of filters 90. Filters 90 will filter and screen out particulate matter which may accumulate in the fuel tank of a vehicle. This filtering process will prevent such particulate matter from traveling into the filtration device secured to rear port 54. In order to facilitate the securement of filters 90 into openings 88, the periphery of opening 88 may be configured with a groove and/or channel in order to receive and engage the periphery of filters 90.

The design of the EVAP valve assembly allows the assembly to be completed in just two steps, namely, inserting port member 44 within valve chamber 62 and securing port member 44 to valve body 42.

In contrast, and in order to accomplish the same task with multiple seals, the valve assembly illustrated in FIG. 1 requires multiple steps such as insertion and securement of a port member into a valve body, insertion and securement of a side plug into the valve body, adjustment of the stroke of a solenoid assembly, and insertion and securement of a plug into the access area required for the adjustment of the stroke of the solenoid.

This design of the valve assembly also reduces assembly package mass and volume due to the reduction of components. In addition, this results in an overall component cost reduction.

As an alternative and as illustrated in FIGS. 9–12, valve assembly 40, body portion 42 and port member 44 are configured to remove the need for side plug 34 illustrated in FIG. 1. The removal of plug 34 allows for manufacturing cost reductions, as there are no unnecessary manufacturing steps required for the insertion and welding of plug 34 to an EVAP valve.

Moreover, and since there is no use of a plug 34 as illustrated in FIG. 1, the configuration illustrated has fewer seals, and accordingly, a much lower rate of seal failure. In addition, and due to the lesser amount of seals, there is a lesser amount of time required for seal testing.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Accordingly, it is to be understood that the present invention has been described by way of illustration and not limitation.

What is claimed is:

1. A solenoid valve assembly comprising:
    a) a guide pin
    b) a valve body, comprising:
        i) a solenoid for generating a magnetic flux for manipulating a plunger between an open position and a closed position, said plunger having a valve end;
        ii) a receiving area;
        iii) a first port; and
        iv) a conduit for connecting said first port to said receiving area; and
    c) a port member being configured and dimensioned to be received and engaged within said receiving area, said port member being in fluid communication with said receiving area and said port member positioning said plunger as said port member is inserted into said receiving area, wherein said port member is inserted into said valve chamber by said guide pin, said guide pin passing through said port member and a portion of said guide pin protrudes outwardly from a valve seat of said port member, said portion of said guide pin being equal to the positioning of said plunger as said port member is inserted into said receiving area.

2. The solenoid valve assembly as in claim 1, wherein said port member sets the limit of the plunger travel and thereby the flow of the solenoid valve assembly as said port member is inserted into said valve chamber.

3. The solenoid valve assembly as in claim 1, wherein said portion of said guide pin is equal to the stroke of said solenoid.

4. The solenoid valve assembly as in claim 1, wherein said guide pin has a stop portion for making contact with said port member after said guide pin is inserted into said port member and said portion of said guide pin protrudes outwardly from said port member.

5. The solenoid valve assembly as in claim 1, wherein said guide pin is mechanically actuated.

6. The solenoid valve assembly as in claim 1, wherein said guide pin maintains said port member within said receiving area while said port member is secured to said valve body.

7. The solenoid valve assembly as in claim 1, wherein said solenoid includes a stop member, said stop member being fixedly secured to said solenoid.

8. The solenoid valve assembly as in claim 1, wherein said solenoid includes a stop member having a shoulder portion, said shoulder portion making contact with said solenoid and a portion of said valve body after said solenoid is inserted into said valve body.

9. The solenoid valve assembly as in claim 1, wherein said solenoid valve is used in an evaporative control valve of a vehicle.

10. The solenoid valve assembly as in claim 1, wherein said conduit connects said receiving area to said first port.

11. The solenoid valve assembly as in claim 10, wherein said port member has an outer diameter slightly smaller than said receiving area.

12. The solenoid valve assembly as in claim 10, wherein said receiving area is an annular receiving area and said port member has an annular wall being configured, dimensioned and positioned for being received and engaged within said first annular receiving area.

13. The solenoid valve assembly as in claim 10, wherein said port member has an annular wall being configured, dimensioned and positioned for being received and engaged within said receiving area, said annular wall having an O-ring being received and engaged within a groove, said O-ring provides an airtight barrier between said port member and the walls of said receiving area.

14. The solenoid valve assembly as in claim 13, wherein said annular wall has a second groove positioned along the periphery of said annular wall, said second groove provides an area for which a portion of said valve body is heat staked into.

15. The solenoid valve assembly as in claim 14, wherein the thickness of said valve body is reduced to provide a heat staking portion, said heat staking portion being positioned in close proximity to said second groove when said port member is inserted into said receiving area.

16. The solenoid valve assembly as in claim 1, further comprising a pair of tab portions for being heat staked to fixedly secure said port member within said receiving area.

17. The solenoid valve assembly as in claim 16, wherein said port member has an annular wall being configured, dimensioned and positioned for being received and engaged within said receiving area, said annular wall having an O-ring being received and engaged within a groove in said annular wall, said O-ring provides an airtight barrier between said port member and the walls of said receiving area.

18. An evaporative control valve for a vehicle in combination with a guide pin, comprising:
a) guide pin
b) valve body, comprising:
  i) a solenoid for manipulating a plunger between an open position and a closed position, said plunger having a valve end;
  ii) a receiving area;
  iii) a first port; and
  iv) a conduit for connecting said first port to said receiving area; and
c) a port member being configured and dimensioned to be received and engaged within said receiving area, said port member providing a passageway of fluid communication between, said receiving area and said port member, said port member being inserted into said receiving area by said guide pin, said guide pin manipulating said plunger into a first position as said port member is inserted into said receiving area.

19. A method for constructing a solenoid valve assembly, comprising:
inserting a stop into a cavity of a solenoid, said stop and said solenoid being inserted through a valve chamber of said solenoid valve assembly;
positioning a spring in said cavity after said stop has been inserted;
inserting a plunger into said cavity after said spring has been inserted, said plunger having a valve member for sealing a port of a port member, said plunger being capable of movement within said cavity;
inserting a guide pin into said port member;
inserting said port member into said valve chamber, a portion of said guide pin makes contact with said plunger and positions said plunger in a spring biased position; and
securing said port member to said solenoid valve assembly.

20. The method as in claim 19, wherein said port member is heat staked to said solenoid valve assembly.

21. The method as in claim 19, wherein the movement of said plunger by said guide pin is equal to the stroke of the solenoid.

22. The method as in claim 19, wherein said port member has an O-ring positioned in an opening in the surface of said port member, said O-ring providing a sealing means.

23. A solenoid valve assembly made by the process of claim 19.

* * * * *